O. M. LEICH.
MULTIPLE RECTIFIER.
APPLICATION FILED DEC. 28, 1916.
1,324,742.
Patented Dec. 9, 1919.
3 SHEETS—SHEET 1.
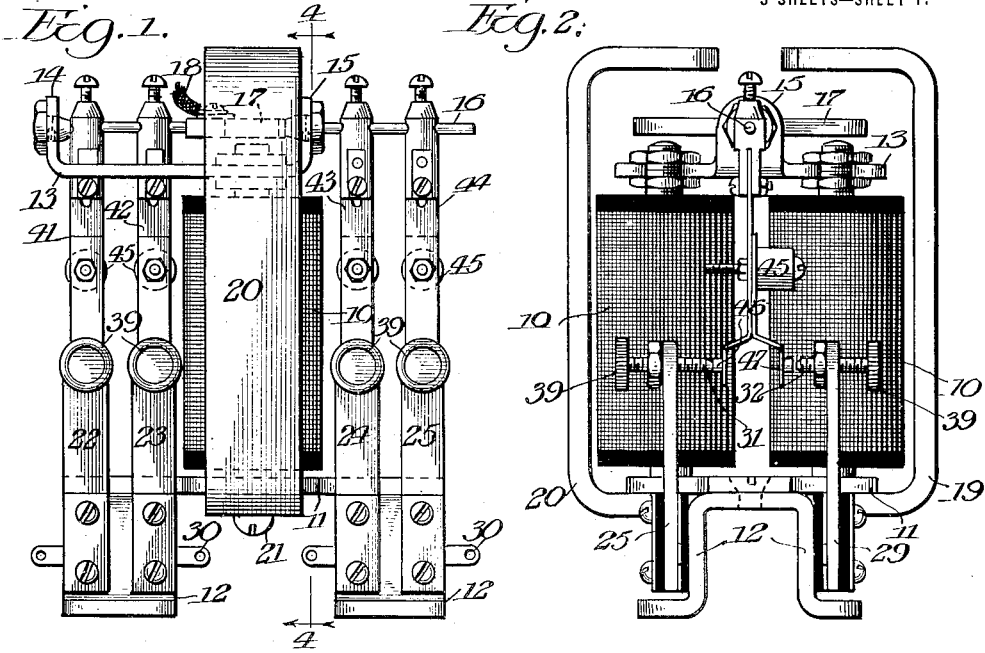
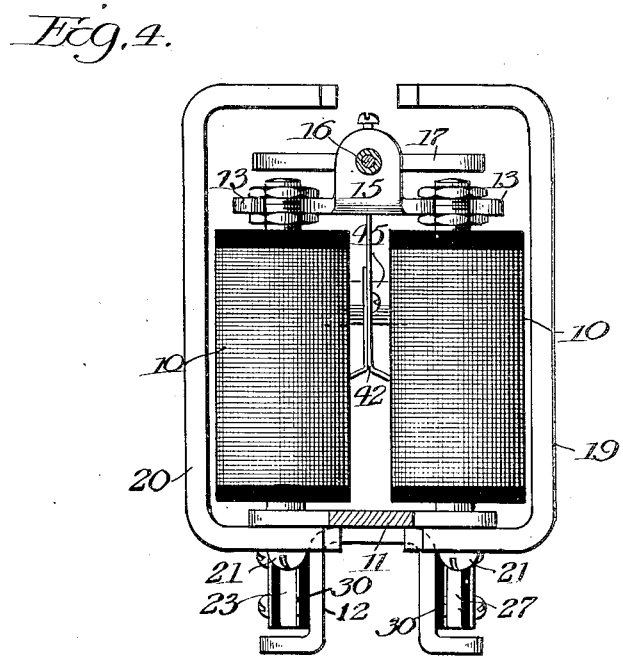
Inventor
Oscar M. Leich
by May & Jabel atty.

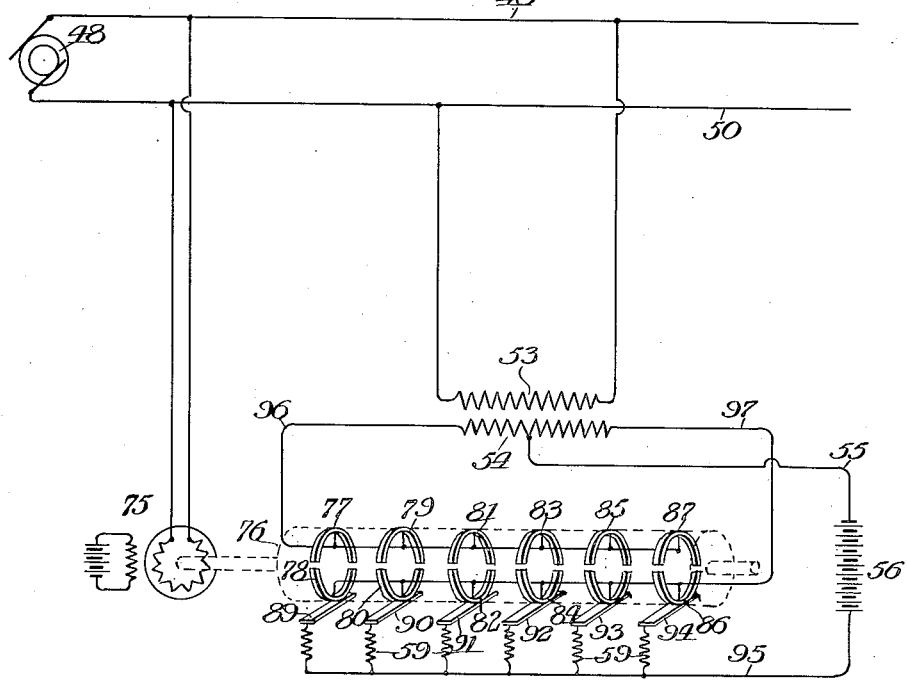
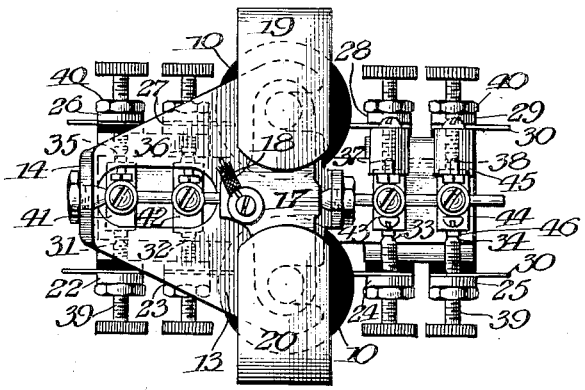

UNITED STATES PATENT OFFICE.

OSCAR M. LEICH, OF GENOA, ILLINOIS, ASSIGNOR TO LEICH ELECTRIC COMPANY, OF GENOA, ILLINOIS.

MULTIPLE RECTIFIER.

1,324,742.  Specification of Letters Patent.  Patented Dec. 9, 1919.

Application filed December 28, 1916. Serial No. 139,397.

*To all whom it may concern:*

Be it known that I, OSCAR M. LEICH, a citizen of the United States, residing at Genoa, in the county of Dekalb and State of Illinois, have invented a certain new and useful Improvement in Multiple Rectifiers, of which the following is a full, clear, concise, and exact description, reference being had to the accompanying drawings, forming a part of this specification.

My invention relates to rectifiers, and has for its object the provision of an improved device of this nature which may be used for rectifying an alternating current so that it is applicable for use as a uni-directional current, such for instance as the charging of storage batteries or the like.

Rectifiers of alternating current as now used when they are either of a vibratory, rotatable, or other movable contact type, are limited to the amount of current which may be rectified by reason of the fact that a slight inequality in the movement of the movable part causes arcing to such an extent that the contact elements either weld together or become otherwise inoperative for performing their proper function.

My invention has for its object the provision of a rectifier of this kind in which a multiple contact arrangement is employed. Each unit of the multiple arrangement being adapted to supply a certain amount of current, all of these units acting in parallel so that any desired amount of current may be rectified. Means are provided in connection with each unit to limit the amount of current for that particular unit to a safe amount so that even though there is a slight discrepancy either in the operation or other conditions no injurious influences due to arcing will occur.

I will explain my invention more in detail by referring to the accompanying drawings illustrating the same, in which Figure 1 is a side view of a rectifier constructed in accordance with my invention;

Fig. 2 is an end view thereof;

Fig. 3 is a top view thereof;

Fig. 4 is a sectional view along line 4—4 of Fig. 1;

Fig. 6 is a diagrammatic view illustrating a modified form of the invention.

Figure 5:
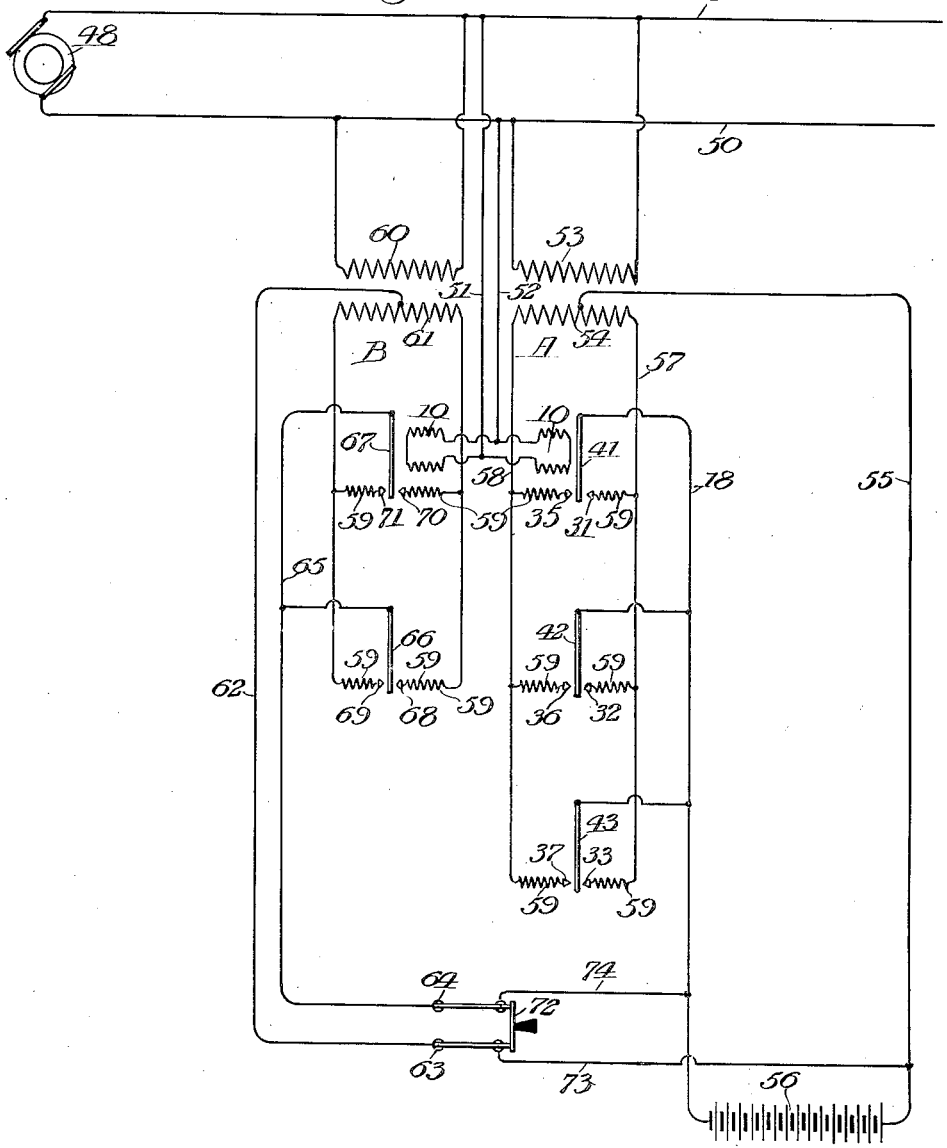
Fig. 5 is a diagrammatic view illustrating the circuit arrangements.

I will first explain the mechanical structure of the device by referring more particularly to Figs. 1, 2, 3 and 4. I here show an electromagnetic device having the coils 10, 10 supported upon a non-magnetic plate 11, which plate is fastened to the legs 12, 12. By means of these legs the device is adapted for attachment in any suitable manner upon any suitable base plate not herein shown. The upper extremities of the coils support a bridge 13, which bridge has bearings 14 and 15 within which the shaft 16 is rotatably mounted. This shaft likewise carries the armature 17, from which armature a conductor 18 extends. The plate 11 likewise carries two permanent magnets 19 and 20, one respectively for each coil, these magnets through the agency of the screws 21 having magnetic connection with the cores of the coils. The armature 17 is of course of magnetic material as is readily understood, and this armature is polarized by the permanent magnets so that this armature moves from one extreme position to the other with each reversal of polarity. Each of the legs 12 carries two contact supports, respectively the contact supports 22, 23, 24, 25, 26, 27, 28 and 29. These contact supports are insulatingly mounted upon the legs, as shown, each contact support however having a connecting clip 30 so that contact may be established with this contact support. The upper extremities of these contact supports carry contacts 31 to 38 inclusive, which contacts are carried by the screws 39 suitably locked in an adjusted position by lock nuts 40. The shaft 16 carries vibratory elements 41, 42, 43, and 44 respectively, each being provied with a synchronizing weight 45, these vibratory elements carrying at their lower extremities contacts 46 and 47 respectively, which contacts of course are connected together being carried by metallic extensions of said metallic vibratory elements, these vibratory elements being in electrical contact with the shaft 16, which shaft is in electrical contact with the armature 17 from which the conductor 18 leads.

It will thus be seen that whenever the armature is in one limiting position or the other contact is established between the armature and four of the contacts, respectively the contacts 31, 32, 33 and 34, and when the armature is in the opposite position contact is established between the contacts 35, 36, 37 and 38. The mechanical construction will thus be clear of this particular form of my invention, it being seen that a multiple contact is established with each operative position of the armature.

I will now explain the circuit arrangement more in detail by referring to Fig. 5 in which the same is shown diagrammatically. I here show an alternator 48 which is furnishing alternating current to the distributing circuit consisting of the conductors 49 and 50.

I have shown two separate and distinct rectifier arrangements, respectively the arrangement A and the arrangement B. As will presently appear these two rectifier arrangements can be used to operate in parallel. The rectifier arrangement A has the vibratory elements 41, 42 and 43 such as shown in Figs. 1 to 4, three being indicated instead of the four shown in those figures, it being thought that three adequately indicate the principle of the invention. These elements 41, 42 and 43 coöperate with the contacts 31—35, 32—36, and 33—37. The coils 10, 10 are shown merely in connection with the element 41, it being understood however that these coils control the vibratory actuation of the various elements 41, 42 and 43, as set out in Figs. 1 to 4 inclusive. The coils 10, 10 are connected to conductors 49 and 50 respectively by the conductors 51 and 52. A transformer having the primary winding 53 is directly connected across the conductors 49 and 50. This transformer has a secondary winding 54 from the central point of which winding a conductor 55 extends to a storage battery.

The construction is here shown as being used for charging the storage battery 56, although as previously stated the rectified current can be used for any suitable purpose other than charging of storage batteries. The other terminal of the storage battery is connected by means of conductor 18 directly to the vibratory elements 41, 42 and 43. The coils 10, 10 as well understood vibrate the elements 41, 42 and 43 in synchronism with the alternating current so that with each cycle of the alternating current the said vibratory elements remain half of the time in association with one of their coöperating contacts and the other half in association with the other of their coöperating contacts. As well understood, the current furnished to the conductors 18 and 55 is thus a uni-directional current. The contacts 31, 32 and 33 are connected to the conductor 57 which extends from one terminal of the secondary winding 54 and the contacts 35, 36 and 37 are connected to the conductor 58 extending from the other terminal of the secondary winding.

In order to limit the amount of current that may be carried by each vibratory element and its associated contacts, I provide resistances 59 which are interposed respectively between the contacts 31, 32 and 33, 35, 36 and 37, and their associated conductors 57 and 58. I have found in the particular form of the invention which is illustrated herein that a current of about one and one-half amperes through either contact will not harm the contacts even though there be an inequality of operation. It will thus be seen that each vibratory element may furnish about three amperes, that is, 1 and ½ ampere due to each of its coöperating contacts. The three vibratory elements 41, 42 and 43 can thus furnish nine amperes without injury to themselves irrespective of faulty operation. The great advantage of thus providing a structure so as to reduce the current capacity will be readily clear to those skilled in the art.

I have shown further the rectifier arrangement B which is served by a transformer having the primary winding 60 and the secondary winding 61 from whose central point a conductor 62 extends to the switch terminal 63. The other switch terminal 64 extends by means of a conductor 65 to vibratory elements 66 and 67 which may again be operated by coils 10, 10 in synchronism with the alternating current. Coöperating contacts 68, 69, and 70, 71 are provided for the elements 66 and 67 respectively. Resistances 59 are likewise provided. The switch 72 may then be used to connect the terminals 63 and 64 by means of conductors 73 and 74 with the conductors 55 and 18 respectively so that both rectifier arrangements work in parallel, thus further increasing the amount of current which may be supplied.

It will thus be seen that it is not necessary to tax the operating qualities of one vibratory armature as a plurality of such rectifier arrangements can be used in parallel and only that number need be operated in accordance with the current requirements.

By referring more particularly to Fig. 6, I show a modified form of the invention in which a synchronous motor 75 operating from the conductors 49, and 50 drives a commutator device 76. This commutator device has a plurality of contact segments respectively 77 and 78, 79 and 80, 81 and 82, 83 and 84, 85 and 86, and 87 and 88. These contact segments each extend for a distance of a little less than one hundred and eighty degrees, and of course are all insulated from each other so far as their mounting upon the commutator device 76 is concerned. Brushes 89, 90, 91, 92, 93, and 94 are utilized to coöperate respectively with each pair of contact segments. Resistances 59 are included in series with the brushes 89, 90, 91, 92, 93 and 94, and then these resistances and brushes are connected to a conductor 95 leading to one terminal of a storage battery 56 which it is designed to charge, the other terminal of the storage battery being connected by conductor 55 to an intermediate portion of the secondary winding 54. The contact segments 77, 79, 81, 83, 85 and 87 are all connected by means of the conductor 96 to one terminal of the secondary winding 54 and the segments 78, 80, 82, 84, 86 and 88 are connected by means of the conductor 97 to the other terminal of the secondary winding 54. The synchronous motor then drives this commutator device synchronously with the alternating current and the rectified current is supplied to the storage battery. It will be apparent of course that any number of segments with their coöperating brushes may be operated in parallel, the resistances controlling the current which each may furnish, thus to prevent burning or other spoiling of the contacts.

From the above it is apparent that the total quantity of current rectified may be as large as desired, merely requiring additional units as they may be needed to supply the total amount of current. The resistance means protects each contact element even though it is temporarily out of step. Thus in charging storage batteries, for instance, the contact elements are likewise protected should the battery current reverse.

In the claims I use the word "rectifier" to mean not only a device by means of which every alternate half-wave is reversed to conform in polarity to the remaining half-waves, thus to produce a rectified current, but also such a device in which only one series of alternate half-waves of the same polarity is used, the other series being disregarded, thus delivering a rectified current.

From what has been thus described the nature of my invention will be readily clear to those skilled in the art. Having however thus described one form which my invention may take, what I claim as new and desire to secure by Letters Patent is:

1. The combination with a source of alternating current, of rectifying means adapted to translate said alternating current into a uni-directional current, a plurality of subcircuits, said rectifying means having a plurality of synchronously operating vibratory contact elements each adapted to supply a subcircuit aforesaid with uni - directional current, a resistance for each subcircuit to limit the quantity of current which may traverse its associated subcircuit to the safe carrying capacity of its associated contact elements, and a consumption circuit to which said subcircuits are connected in parallel relation.

2. The combination with a source of alternating current, of rectifying means adapted to translate said alternating current into a uni-directional current, a plurality of subcircuits, said rectifying means having a plurality of synchronously operating vibratory contact elements each adapted to supply a subcircuit aforesaid with uni - directional current, a non-inductive resistance for each circuit for limiting the quantity of current traversing its associated circuit to the safe carrying capacity of its associated contact elements, and a consumption circuit to which said subcircuits are connected in parallel relation.

3. The combination with a source of alternating current, of a rectifier adapted to translate said alternating current into a uni-directional current, a plurality of subcircuits, said rectifier having a plurality of synchronously operating vibratory contact elements each adapted to supply a subcircuit aforesaid with uni-directional current, a resistance for each circuit for limiting the quantity of current traversing its associated circuit, a consumption circuit to which said subcircuits are connected in parallel relation, and a single armature for atuating said contact elements.

4. The combination with a source of alternating current, of a rectifier adapted to translate said alternating current into a uni-directional current, a plurality of subcircuits, said rectifier having a plurality of vibratory contact elements each adapted to supply a subcircuit aforesaid with uni-directional current, means for each circuit for limiting the quantity of current traversing its associated circuit to the safe carrying capacity of its associated contact elements, and a consumption circuit to which said subcircuits are connected in parallel relation.

5. A vibratory rectifier having an electromagnet, a vibratory armature actuated thereby in synchronism with the current reversals in said electromagnet, and a plurality of alternating current rectifiers synchronously controlled by said armature, each rectifier including a movable contact element, said movable contact elements being synchronously actuated by said armature, and being relatively to each other, of like polarity.

6. A vibratory rectifier having an electromagnet, a vibratory armature actuated thereby in synchronism with the current reversals in said electromagnet, and a plurality of alternating current rectifiers having connections whereby they are electrically connected in parallel relation and having means whereby they are synchronously controlled by said armature, each rectifier including a movable contact element, said movable contact elements being synchronously actuated by said armature.

7. A vibratory rectifier having an electromagnet, a vibratory armature actuated thereby in synchronism with the current reversals in said electromagnet, and a plurality of alternating current rectifiers having connections whereby they are electrically connected in parallel relation and having means whereby they are synchronously controlled by said armature, each rectifier including a movable contact element, said movable contact elements being synchronously actuated by said armature and being relatively to each other, of like polarity.

8. A vibratory rectifier having an electromagnet, a vibratory armature actuated thereby in synchronism with the current reversals in said electromagnet, and a plurality of alternating current rectifiers synchronously controlled by said armature, each rectifier including a movable contact element, said movable contact elements being synchronously actuated by said armature, and said movable contact elements being structurally mounted in parallel relationship.

9. A vibratory rectifier having an electromagnet, a vibratory armature actuated thereby in synchronism with the current reversals in said electromagnet, and a plurality of alternating current rectifiers synchronously controlled by said armature, each rectifier including a movable contact element, said movable contact elements being synchronously actuated by said armature and being relatively to each other, of like polarity, and said movable contact elements being structurally mounted in parallel relationship.

10. A vibratory rectifier having an electro magnet, a vibratory armature actuated thereby in synchronism with the current reversals in said electromagnet, and a plurality of alternating current rectifiers having connections whereby they are electrically connected in parallel relation and having means whereby they are synchronously controlled by said armature, each rectifier including a movable contact element, said movable contact elements being synchronously actuated by said armature, and said movable contact elements being structurally mounted in parallel relationship.

11. A vibratory rectifier having an electromagnet, a vibratory armature actuated thereby in synchronism with the current reversals in said electromagnet, and a plurality of alternating current rectifiers having connections whereby they are electrically connected in parallel relation and having means whereby they are synchronously controlled by said armature, each rectifier including a movable contact element, said movable contact elements being synchronously actuated by said armature and being relatively to each other, of like polarity, and said movable contact elements being structurally mounted in parallel relationship.

12. The combination with a source of alternating current, of rectifying means adapted to translate said alternating current into a uni-directional current, a plurality of subcircuits, said rectifying means having a plurality of synchronously operating vibratory contact elements and coöperating relatively stationary contact elements each vibratory contact element being adapted to supply a subcircuit aforesaid with uni-directional current, a resistance for each circuit for limiting the quantity of current traversing its associated circuit to the safe carrying capacity of its associated contact elements, and a consumption circuit to which said subcircuits are connected in parallel relation.

13. The combination with a source of alternating current, of rectifying means adapted to translate said alternating current into a uni-directional current, a plurality of subcircuits, said rectifying means having a plurality of synchronously operating vibratory contact elements and a pair of coöperating relatively stationary contact elements associated with each vibratory contact element each vibratory contact element being adapted to supply a subcircuit aforesaid with uni-directional current, a resistance for each circuit for limiting the quantity of current traversing its associated circuit to the safe carrying capacity of its associated contact elements, and a consumption circuit to which said subcircuits are connected in parallel relation.

In witness whereof I hereunto subscribe my name this 22nd day of December, A. D., 1916.

OSCAR M. LEICH.

Witnesses:
A. LYDA JONES,
HAZEL A. JONES.